United States Patent
Li et al.

(10) Patent No.: US 12,169,469 B2
(45) Date of Patent: *Dec. 17, 2024

(54) IMAGE DATA RECEPTION VIA NON-VIDEO INTERFACE

(71) Applicant: Synaptics Incorporated, San Jose, CA (US)

(72) Inventors: Shi-Jie Li, Sichuan (CN); Thavatchai Montreevat, Irvine, CA (US)

(73) Assignee: Synaptics Incorporated, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/439,195

(22) Filed: Feb. 12, 2024

(65) Prior Publication Data

US 2024/0184737 A1 Jun. 6, 2024

Related U.S. Application Data

(63) Continuation of application No. 17/688,512, filed on Mar. 7, 2022, now Pat. No. 11,934,339.

(51) Int. Cl.
*G06F 13/42* (2006.01)
*G06F 13/40* (2006.01)
*H04N 5/06* (2006.01)
*H04N 5/77* (2006.01)

(52) U.S. Cl.
CPC ...... *G06F 13/4295* (2013.01); *G06F 13/4068* (2013.01); *H04N 5/77* (2013.01); *G06F 2213/0016* (2013.01); *H04N 5/06* (2013.01)

(58) Field of Classification Search
CPC ............ G06F 13/4068; G06F 13/4295; G06F 13/4291; G06F 2213/0016; H04N 5/04; H04N 5/77; H04N 5/06; H04N 21/4305; G09G 5/006
USPC ......................................................... 710/305
See application file for complete search history.

(56) References Cited

U.S. PATENT DOCUMENTS

| | | | |
|---|---|---|---|
| 8,203,651 B2 | 6/2012 | Zakriti | |
| 8,477,132 B2* | 7/2013 | Seo | G09G 3/2096 345/204 |
| 8,643,781 B1* | 2/2014 | Ilan | H04N 5/66 348/790 |
| 8,854,542 B1* | 10/2014 | Ilan | G09G 3/2096 348/790 |
| 11,381,787 B2* | 7/2022 | Nakatani | H04N 23/634 |

(Continued)

*Primary Examiner* — Pritham D Prabhakher
(74) *Attorney, Agent, or Firm* — Paradice & Li LLP

(57) ABSTRACT

This disclosure provides methods, devices, and systems for transmitting and receiving image data. The present implementations more specifically relate to repurposing non-video interfaces to receive image data. In some aspects, an image processing device may be coupled to an image source via an audio interface. For example, the audio interface may be an inter-IC sound (I2S) serial bus interface having at least a serial data input and a word select (WS) input. In some implementations, the serial data input may be coupled to receive image data from the image source and the WS input may be coupled to receive a WS signal that tracks a horizontal synchronization (HSYNC) signal associated with the image data. Accordingly, the image processing device may capture (or store) frames of received image data, where the beginning of each frame is aligned with an edge of the WS signal (and thus, the HSYNC signal).

20 Claims, 8 Drawing Sheets

(56) References Cited

U.S. PATENT DOCUMENTS

| | | |
|---|---|---|
| 11,388,315 B2* | 7/2022 | Hanamoto ............ H04N 21/242 |
| 2010/0118192 A1 | 5/2010 | Zakriti |
| 2010/0303097 A1* | 12/2010 | Otani ..................... G09G 5/006 |
| | | 370/503 |
| 2011/0292028 A1* | 12/2011 | Seo ...................... G09G 3/2096 |
| | | 345/213 |
| 2012/0320176 A1 | 12/2012 | Tanaka et al. |
| 2014/0002664 A1 | 1/2014 | Hanabusa |
| 2014/0267902 A1* | 9/2014 | Nishio ............... H04N 21/4516 |
| | | 348/445 |
| 2017/0034401 A1* | 2/2017 | Shiohara .............. G09G 3/2096 |
| 2017/0169765 A1 | 6/2017 | Lee et al. |
| 2019/0068843 A1 | 2/2019 | Lin |
| 2020/0145558 A1 | 5/2020 | Ferrand |
| 2021/0099628 A1 | 4/2021 | Nakamura |
| 2021/0281805 A1* | 9/2021 | Nakatani .................. H04N 5/04 |
| 2021/0377424 A1* | 12/2021 | Hanamoto ......... H04N 21/4305 |
| 2022/0038624 A1 | 2/2022 | Hsieh et al. |
| 2022/0246085 A1 | 8/2022 | Otsuka |

\* cited by examiner

IMAGE DATA RECEPTION VIA NON-VIDEO INTERFACE

CROSS REFERENCE TO RELATED APPLICATIONS

This application is a continuation of U.S. patent application Ser. No. 17/688,512 filed Mar. 7, 2022, entitled "IMAGE DATA RECEPTION VIA NON-VIDEO INTERFACE," which is assigned to the assignee hereof. The disclosure of the prior Application is considered part of and is incorporated by reference in this Patent Application.

TECHNICAL FIELD

The present implementations relate generally to digital image transmission, and specifically to techniques for receiving image data via non-video interfaces.

BACKGROUND OF RELATED ART

Many digital image processing and display architectures employ frame buffers to store (or "buffer") image data received from an image source (such as an image capture or rendering device) for subsequent processing or output to an electronic display. The frame buffer aggregates or assembles the received image data into rows and columns of pixels values representing a "frame" or image. To ensure that the pixel values are aligned with the correct rows and columns of a corresponding frame, the image source often transmits control or synchronization signals together with a data signal carrying the image data. For example, a vertical synchronization (VSYNC) signal may indicate the start of a new frame or image and a horizontal synchronization (HSYC) signal may indicate the start of a new row of pixel values associated with the current frame. Accordingly, the image processing (or display) device may align the sampling or reception of the image data with the VSYNC and HSYNC signals to store a complete frame of pixel values in the frame buffer.

Communication interfaces are used to transmit and receive data and other signals between integrated circuit (IC) devices. Communication interfaces that are designed to receive image data (also referred to as "video interfaces") often include inputs to receive VSYNC and HSYNC signals, in addition to the image data, from an image source. However, many existing communication interfaces are designed for non-video applications and thus may not support some of the control or synchronization functions associated with image data reception.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method performed by a controller for an image processing device. The method includes steps of obtaining a series of bits representing a horizontal synchronization (HSYNC) signal associated with image data output by an image source; generating a local synchronization signal based at least in part on the obtained series of bits; receiving the image data via a first interface associated with the image processing device; and capturing a frame of the received image data so that the beginning of the frame is aligned with an edge of the local synchronization signal.

Another innovative aspect of the subject matter of this disclosure can be implemented in a controller for an image processing device, including a processing system and a memory. The memory stores instructions that, when executed by the processing system, cause the controller to obtain a series of bits representing an HSYNC signal associated with image data output by an image source; generate a local synchronization signal based at least in part on the obtained series of bits; receive the image data via a first interface associated with the image processing device; and capture a frame of the received image data so that the beginning of the frame is aligned with an edge of the local synchronization signal.

Another innovative aspect of the subject matter of this disclosure can be implemented in an image processing device including a controller and an interface configured to receive image data from an image source. The controller is configured to obtain a series of bits representing an HSYNC signal associated with the image data; generate a local synchronization signal based at least in part on the obtained series of bits; and capture a frame of the received image data so that the beginning of the frame is aligned with an edge of the local synchronization signal.

BRIEF DESCRIPTION OF THE DRAWINGS

The present implementations are illustrated by way of example and are not intended to be limited by the figures of the accompanying drawings.

DETAILED DESCRIPTION

Figure 1:
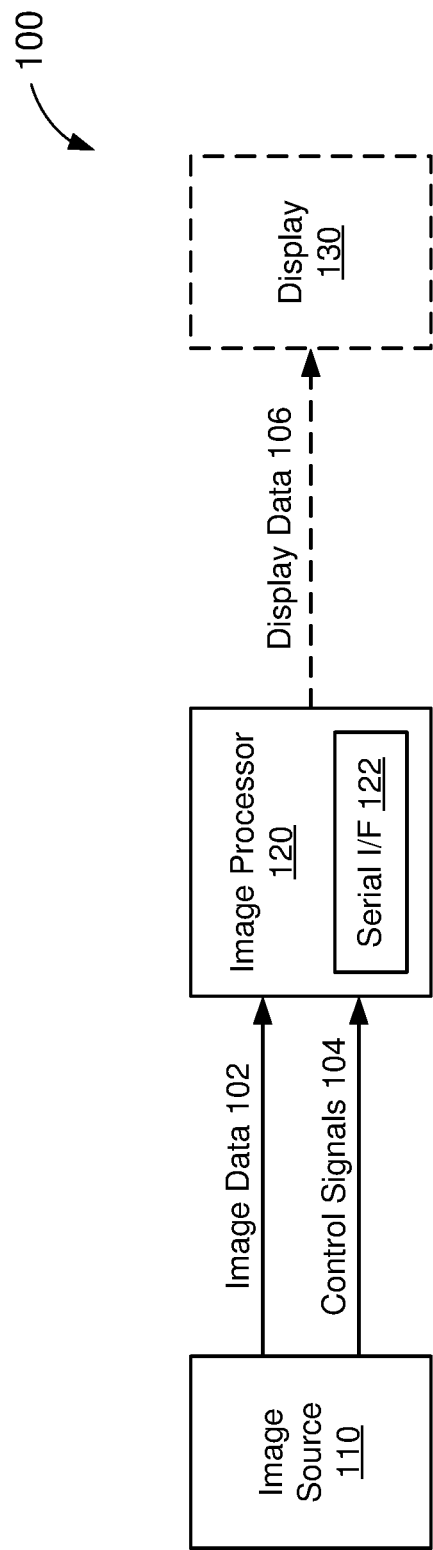
FIG. 1 shows a block diagram of an example digital imaging system.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Aspects of the present disclosure recognize that some integrated circuit (IC) devices used in non-video applications can be repurposed to support one or more video applications (such as digital image processing or display). For example, the memory and processing resources of an IC device originally configured for audio processing applications can be reconfigured to process image data through software or firmware updates. Repurposing IC devices to support new features may extend the lifetime of existing IC devices while also reducing the costs associated with implementing new features. However, the communication interfaces associated with such IC devices (also referred to as "non-video interfaces") may not support some of the control or synchronization functions associated with image data reception. For example, many non-video interfaces lack inputs to receive vertical synchronization (VSYNC) or horizontal synchronization (HSYNC) signals. Redesigning or retrofitting existing IC devices to include video interfaces may be cost-prohibitive. Accordingly, new signaling techniques or device configurations are needed to support image data reception via non-video interfaces.

Various aspects relate generally to communication interfaces for transmitting and receiving image data, and more particularly, to repurposing non-video interfaces to receive image data. In some aspects, an image processing device may be coupled to an image source via a communication interface that is configured for audio communications (also referred to as an "audio interface"). For example, the audio interface may be an inter-IC sound (I2S) serial bus interface having at least a serial data input and a word select (WS) input. In some implementations, the serial data input may be coupled to receive image data from the image source and the WS input may be coupled to receive a WS signal that tracks an HSYNC signal associated with the image data. Accordingly, the image processing device may capture (or store) frames of received image data, where the beginning of each frame is aligned with an edge of the WS signal (and thus, the HSYNC signal).

In some aspects, the image processing device may align the WS signal with the HSYNC signal by obtaining a series of bits representing the HSYNC signal (referred to herein as "HSYNC bits"). For example, the image processing device may compare the HSYNC bits with a known bit pattern representing the WS signal to determine a phase offset between the HSYNC signal and the WS signal. The image processing device may further adjust the bit pattern to compensate for the phase offset. In some implementations, the image processing device may receive the HSYNC bits directly from the image source via the serial data input of the audio interface. In some other implementations, the image processing device may receive the HSYNC signal from the image source via a separate audio interface and may obtain the HSYNC bits by sampling the HSYNC signal responsive to a local clock signal.

Particular implementations of the subject matter described in this disclosure can be implemented to realize one or more of the following potential advantages. The present implementations allow new features and functionality to be added to existing IC devices by repurposing non-video interfaces to receive image data. As described above, many non-video interfaces lack inputs to receive synchronization signals (such as VSYNC and HSYNC signals) that are used to align pixel values with respective rows and columns of a given frame. Without proper frame alignment, the image data stored in the frame buffer may be corrupted or unreadable. However, by aligning a WS signal with the HSYNC signal associated with image data output by an image source, aspects of the present disclosure may leverage the WS signal associated with an audio interface to perform the horizontal pixel alignment function that would otherwise be associated with the HSYNC signal. As a result, existing audio interfaces can be repurposed for image data reception.

FIG. 1 shows a block diagram of an example digital imaging system 100. The digital imaging system 100 includes an image source 110 and an image processor 120. In some implementations, the digital imaging system 100 also may include a digital display 130.

The image source 110 may be any device or component capable of generating and outputting image data 102. In some implementations, the image source 110 may be an image capture device (such as a camera) that captures a pattern of light from a scene and converts the light to digital image data 102. Accordingly, the image data 102 may include an array of pixel values (such as color or brightness values) representing a digital image of the scene. The image source 110 also outputs one or more control signals 104 associated with the image data 102. The control signals 104 may include timing and synchronization signals that can be used to sample and align the image data 102 with one or more frames or images. Example control signals may include, among other examples, a clock signal, a VSYNC signal, or an HSYNC signal.

The image processor 120 is configured to receive and store (or buffer) the image data 102 for further processing. In some aspects, the image processor 120 may convert the image data 102 to display data 106 that can be interpreted by a display 130. The display 130 may be any digital display device capable of rendering or displaying digital images based on the display data 106. Example suitable display technologies include light emitting diode (LED), organic LED (OLED), cathode ray tube (CRT), liquid crystal display (LCD), and plasma, among other examples. In some implementations, the image processor 120 may adjust the pixel values associated with the image data 102 so that the display data 106 more accurately reflects the original scene captured by the image source 110. In some other aspects, the image processor 120 may infer information about the image data 102 (such as objects of interest).

The image processor 120 may receive the image data 102 via a serial interface (I/F) 122. In some aspects, the serial interface 122 may be a non-video interface that does not include inputs to receive VSYNC or HSYNC signals. In such aspects, the image processor 120 may obtain a series of bits representing the HSYNC signal (also referred to as "HSYNC bits") and generate a local synchronization signal based on the HSYNC bits so that one or more edges of the local synchronization signal are aligned with respective edges of the HSYNC signal. In some implementations, the image processor 120 may receive the HSYNC bits directly from the image source 110 (as image data 102) via the serial interface 122. In some other implementations, the image processor 120 may receive the HSYNC signal from the image source 110 via a secondary non-video interface (not shown for simplicity) and obtain the HSYNC bits by sampling the received HSYNC signal responsive to a local clock signal.

In some aspects, the image processor 120 may sample or receive the image data 102 based, at least in part, on the local synchronization signal. More specifically, the image processor 120 may capture or store frames of image data 102 so that the beginning of each frame is aligned with a respective edge (such as a rising edge or a falling edge) of the local synchronization signal. As described above, the edges of the HSYNC signal indicate the start of new rows of pixel values associated with the current frame of image data 102. Thus, by aligning the edges of the HSYNC signal with respective edges of the local synchronization signal, aspects of the present disclosure may ensure that the image data 102 sampled by the image processor 120 is properly aligned with one or more frames (such that individual pixel values associated with the image data 102 do not cross frame boundaries).

Figure 2A:
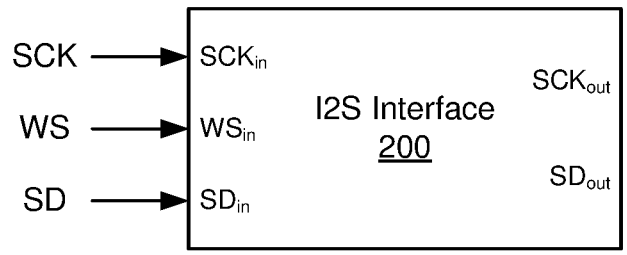
FIG. 2A shows an example inter-integrated circuit sound (I2S) serial bus interface.

FIG. 2A shows an example I2S serial bus interface 200. In some implementations, the I2S interface 200 may be one example of the serial interface 122 of FIG. 1. As shown in FIG. 2A, the I2S interface 200 includes a serial clock input ($SCK_{in}$) configured to receive a serial clock signal (SCK), a word select input ($WS_{in}$) configured to receive a word select (WS) signal, and a serial data input ($SD_{in}$) configured to receive a serial data (SD) signal. In the example of FIG. 2A, the I2S interface 200 is also shown to include a serial clock output ($SCK_{out}$) and a serial data output ($SD_{out}$). In some implementations, the I2S interface 200 may be further configured to output data and clock signals via $SD_{out}$ and $SCK_{out}$, respectively. The I2S interface 200 conforms to the I2S serial bus interface standard, which defines a set of connections and communication protocols for digital audio devices. As such, the I2S interface 200 lacks inputs to receive synchronization signals associated with image data alignment (such as VSYNC and HSYNC signals).

Figure 2B:
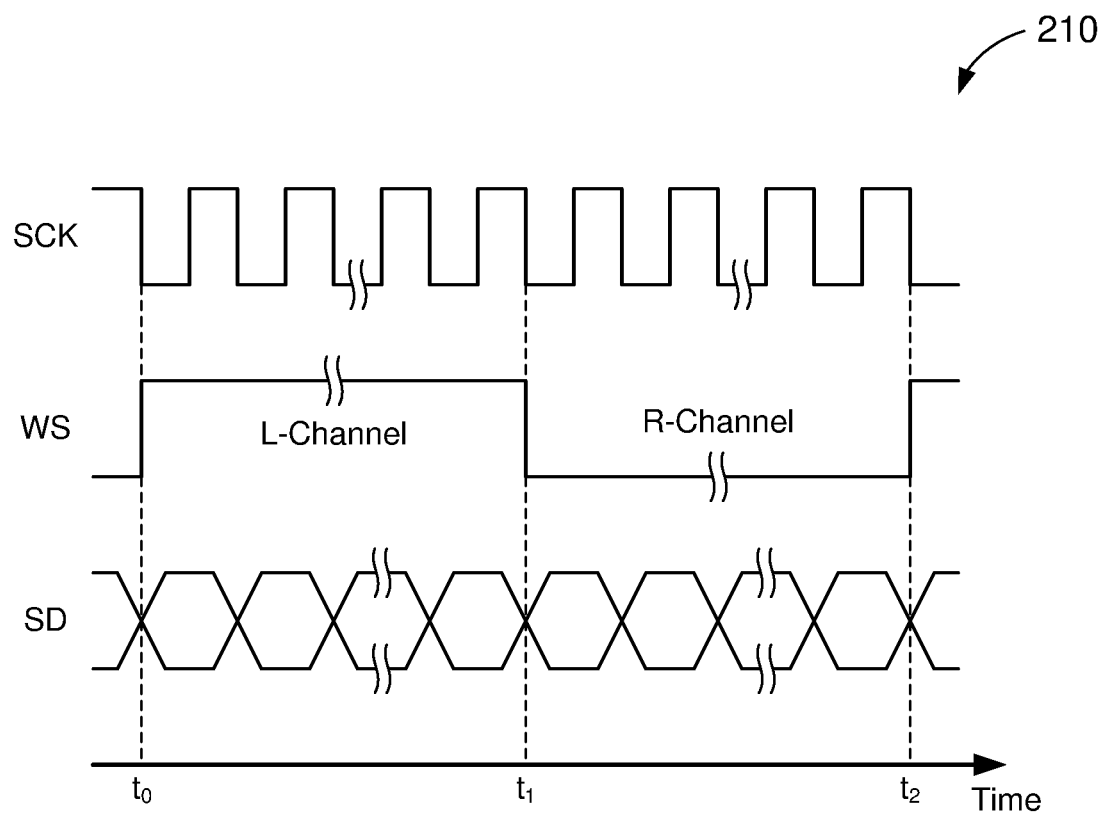
FIG. 2B shows a timing diagram depicting an example operation of the I2S serial bus interface of FIG. 2A.

FIG. 2B shows a timing diagram 210 depicting an example operation of the I2S serial bus interface 200 of FIG. 2A. With reference for example to FIG. 2A, the I2S interface 200 receives an SCK signal, a WS signal, and an SD signal via the inputs $SCK_{in}$, $WS_{in}$, and $SD_{in}$, respectively, from times $t_0$ to $t_2$. The I2S interface 200 samples the SD signal responsive to the SCK signal. In some implementations, the I2S interface 200 may acquire a respective data sample (of the SD signal) in response to each rising-edge transition of the SCK signal (such as when SCK transitions from a logic-low state to a logic-high state).

In some implementations, audio data may be transmitted in "words" alternating between left and right audio channels.

More specifically, each successive word of audio data is associated with a different (left or right) audio channel, and a different word of audio data is transmitted every sample interval. The WS signal indicates whether the sampled data is associated with a left audio channel (L-Channel) or a right audio channel (R-Channel). In the example of FIG. 2B, the WS signal indicates the left audio channel when asserted to a logic-high state (such as between times $t_0$ and $t_1$) and indicates the right audio channel when asserted to a logic-low state (such as between times $t_1$ and $t_2$). Accordingly, the WS signal may periodically oscillate between the logic-high state (L-Channel) and the logic-low state (R-Channel). In some other implementations, the I2S interface 200 may be configured to operate in a time-division multiplexed (TDM) mode that supports transmissions of more than two channels of data (not shown for simplicity).

As shown in FIG. 2B, data samples acquired between times $t_0$ and $t_1$ are aligned with a logic-high state of the WS signal and are thus associated with the left audio channel. In some implementations, the I2S interface 200 may store such data in a data buffer (or a portion of memory) allocated for the left audio channel. By contrast, data samples acquired between times $t_1$ and $t_2$ are aligned with a logic-low state of the WS signal and are thus associated with the right audio channel. In some implementations, the I2S interface 200 may store such data in a data buffer (or a portion of memory) allocated for the right audio channel.

With reference for example to FIG. 1, the I2S interface 200 may be implemented by the image processor 120 to receive image data 102 from the image source 110. For example, the SD signal may carry the image data 102. However, because image data is not associated with left and right audio channels, the image source 110 may not provide a WS signal suitable for aligning the pixel values with respective data buffers or portions of memory. Aspects of the present disclosure recognize that, without proper alignment, the image data stored in memory may become corrupted or unreadable. For example, the smallest unit of image data may consist of 8 bits (or a byte). Thus, if a unit of image data is not aligned with an 8-bit boundary in memory, the entire unit of image data (including any subsequent units of image data stored thereafter) may be corrupted.

In some aspects, the image processor 120 may generate the WS signal locally based, at least in part, on a series of HSYNC bits representing an HSYNC signal. For example, a bit value equal to "1" may indicate that the HSYNC signal is in a logic-high state and a bit value equal to "0" may indicate that the HSYNC signal is in a logic-low state. In some implementations, the image processor 120 may receive the HSYNC bits directly from the image source 110 via the same I2S interface used to receive the image data. For example, the HSYNC bits may be carried on the SD signal and received at $SD_{in}$ of the I2S interface. In some other implementations, the image processor 120 may receive the HSYNC signal from the image source 110 via a second I2S interface (not shown for simplicity) that is different than the I2S interface used to receive the image data. For example, the HSYNC signal may be received at $SD_{in}$ of the second I2S interface. In such implementations, the HSYNC bits may be acquired by sampling the HSYNC signal at the second I2S interface.

Aspects of the present disclosure recognize that the WS signal can be represented by a repeating pattern of bits, including a number (N) of 1's and an equal number (N) of 0's. For example, the image processor 120 may generate the WS signal shown in FIG. 2B by outputting N consecutive 1's, between times $t_0$ and $t_1$, followed by N consecutive 0's, between times $t_1$ and $t_2$ (where N may be any integer value). This bit pattern (also referred to as a "WS pattern") can be repeated, at time $t_2$ and beyond, to produce a continuous WS signal. In some implementations, the image processor 120 may align the WS pattern with the HSYNC bits so that bit transitions (such as from 0 to 1 or from 1 to 0) among the HSYNC bits occur concurrently with respective bit transitions in the WS pattern. As a result, each (rising or falling) edge of the HSYNC signal is aligned with a respective edge of the WS signal, and thus, each unit of image data captured by the I2S interface 200 resides within a frame boundary.

Figure 3:
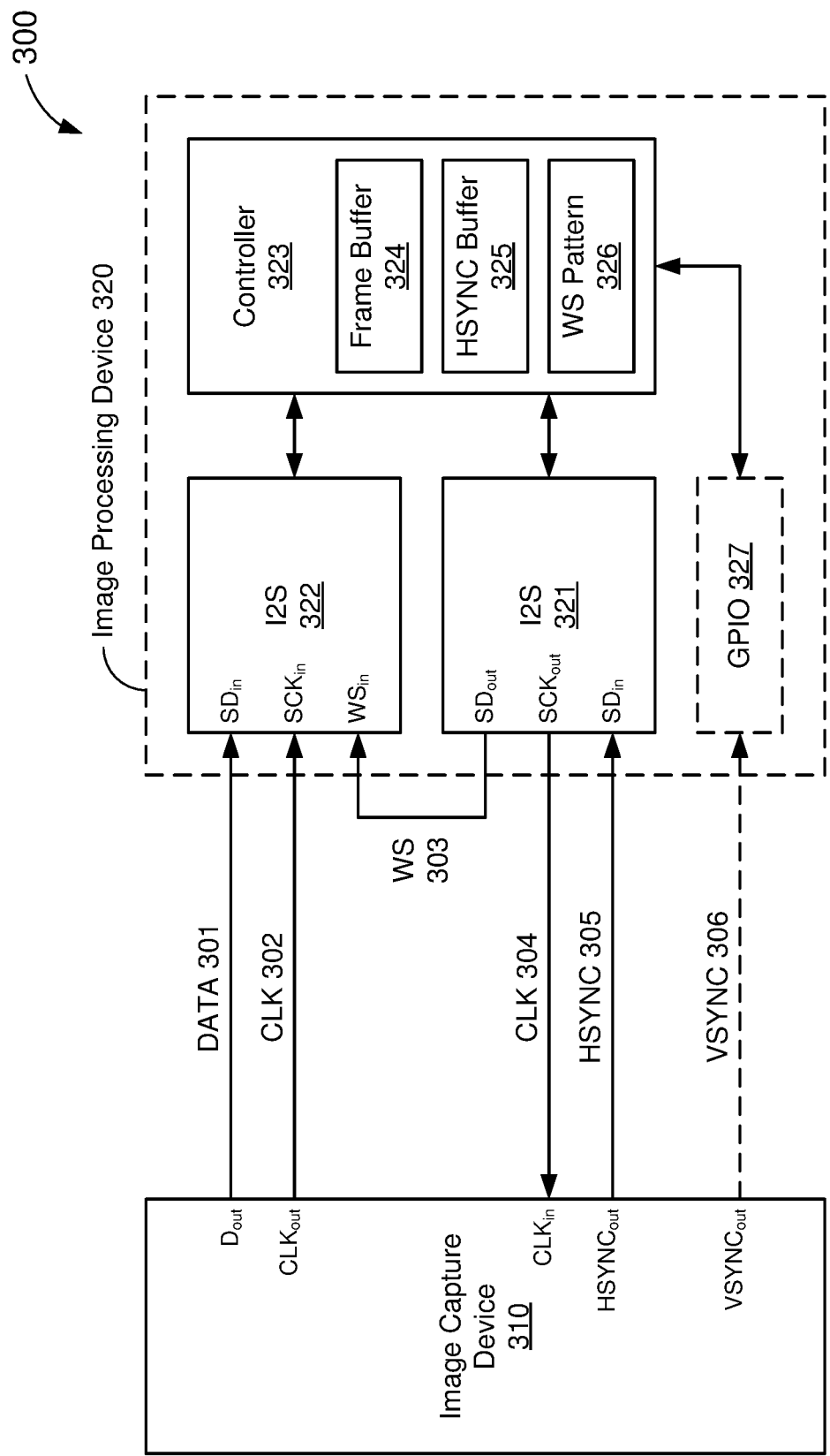
FIG. 3 shows a block diagram of a digital imaging system, according to some implementations.

FIG. 3 shows a block diagram of a digital imaging system 300, according to some implementations. The digital imaging system 300 includes an image capture device 310 and an image processing device 320. In some implementations, the image capture device 310 and the image processing device 320 may be examples of the image source 110 and the image processor 120, respectively, of FIG. 1.

In the example of FIG. 3, the image capture device 310 is shown to include a data output ($D_{out}$) configured to output a serial data signal 301, a clock output ($CLK_{out}$) configured to output a clock signal 302, a clock input ($CLK_{in}$) configured to receive a clock signal 304, and an HSYNC output ($HSYNC_{out}$) configured to output an HSYNC signal 305. In some aspects, the image capture device 310 may be a camera that captures a pattern of light from a scene and converts the light to digital image data. In such aspects, the serial data signal 301 may carry the image data generated by the image capture device 310 and the clock signal 302 may indicate a timing of the bits in the data signal 301. In some implementations, the data signal 301 and the clock signal 302 may be examples of the SD signal and the SCK signal, respectively, of FIGS. 2A and 2B. In some implementations, the image capture device 310 may generate the clock signal 302 based on the received clock signal 304. In such implementations, the clock signals 302 and 304 may have the same frequency.

The image processing device 320 includes I2S interfaces 321 and 322 and a controller 323. In some implementations, each of the I2S interfaces 321 and 322 may be one example of the I2S interface 200 of FIG. 2. In the example of FIG. 3, the first I2S interface 321 is configured to operate in a master mode and the second I2S interface 322 is configured to operate in a slave mode. The master I2S interface 321 is shown to include a serial data output ($SD_{out}$) configured to output a WS signal 303, a serial clock output ($SCK_{out}$) configured to output the clock signal 304, and a serial data input ($SD_{in}$) configured to receive the HSYNC signal 305. The slave I2S interface 322 is shown to include a serial data input ($SD_{in}$) configured to receive the data signal 301, a serial clock input ($SCK_{in}$) configured to receive the clock signal 302, and a word select input ($WS_{in}$) configured to receive the WS signal 303.

The controller 323 controls an operation of the I2S interfaces 321 and 322. In some aspects, the controller 323 may operate the I2S interfaces 321 and 322 to capture or receive frames of image data output by the image capture device 310. During a setup phase, the controller 323 may align rising (or falling) edges of the HSYNC signal 305 with respective edges of the WS signal 303. As described with reference to FIG. 2B, the WS signal 303 may be generated by outputting a WS pattern 326 from the master I2S interface 321. For example, the master I2S interface 321 may output the WS signal 303 in a logic-high state when the current bit of the WS pattern 326 has a value equal to 1 and may output the WS signal 303 in a logic-low state when the current bit of the WS pattern 326 has a value equal to 0. Accordingly, the phase of the WS signal 303 depends on the arrangement of bits in the WS pattern 326. In some implementations, the controller 323 may store an initial or default bit pattern as the WS pattern 326.

In the example of FIG. 3, the master I2S interface 321 acquires a series of HSYNC bits by sampling the HSYNC signal 305, responsive to the clock signal 304, over a duration spanning at least a period of the WS signal 303. The controller 323 may store the HSYNC bits in an HSYNC buffer 325. In some aspects, the controller 323 may compare the pattern of bits stored in the HSYNC buffer 325 with the WS pattern 326 to determine a phase offset between a rising (or falling) edge of the HSYNC signal 305 and a rising (or falling) edge of the WS signal 303. For example, a rising edge of the HSYNC signal 305 occurs when the bit values in the HSYNC buffer 325 transition from 0 to 1. Similarly, a rising edge of the WS signal 303 occurs when the bit values in the WS pattern 326 transition from 0 to 1. In some implementations, the controller 323 may adjust the WS pattern 326 so that the 0-to-1 bit transition in the WS pattern 326 is aligned with the 0-to-1 bit transition in the HYSNC buffer 325. As a result, the rising edge of the HSYNC signal 305 is aligned with a rising edge of the WS signal 303.

During a data capture phase, the controller 323 captures one or more frames of image data received via the slave I2S interface 322. For example, the slave I2S interface 322 may acquire bits of image data by sampling the data signal 301 (at $SD_{in}$) responsive to the clock signal 302. In some implementations, the controller 323 may store each bit of image data in a portion of a frame buffer 324 associated with the state of the WS signal 303 when the bit of image data is acquired. For example, each bit of image data acquired while the WS signal 303 is in a logic-high state may be stored in a portion of the frame buffer 324 associated with a left audio channel, and each bit of image data acquired while the WS signal 303 is in a logic-low state may be stored in a portion of the frame buffer 324 associated with a right audio channel. Because the WS signal 303 is aligned with the HSYNC signal 305, each unit of image data is also aligned with a respective 8-bit boundary in the frame buffer 324 and can thus be recovered for further processing.

As described above, the slave I2S interface 322 samples the data signal 301 in response to rising (or falling) edge transitions of the clock signal 302. In other words, the I2S interface 322 may capture a bit of data as long as the clock signal 302 is active. However, the data signal 301 may not carry valid image data during certain periods of time (such as horizontal or vertical blanking intervals). As a result, some of the data sampled by the I2S interface 322 (also referred to as "blank" data) may be subsequently discarded by the controller 323, which consumes additional processing resources. Aspects of the present disclosure recognize that some image capture devices support pixel clock gating, which allows the image capture device to output a valid clock signal only when the data signal carries valid image data. In some aspects, the image processing device 320 may leverage the pixel clock gating capabilities of the image capture device 310 to reduce the amount of data discarded by the image processing device 320.

For example, the image capture device 310 may further include a VSYNC output ($VSYNC_{out}$) configured to output a VSYNC signal 306. In some implementations, the image processing device 320 may include a general purpose input/output (GPIO) 327 configured to receive the VSYNC signal 306. As described above, the VSYNC signal 306 indicates when a frame of valid image data is carried on the data signal 301. Thus, in some implementations, the controller 323 may control the slave I2S interface 322 to selectively sample the data signal 301 based on the state of the VSYNC signal 306. For example, the controller 323 may pause the sampling of the data signal 301 by the I2S interface 322 when the VSYNC signal 306 indicates that the data signal 301 does not carry valid image data (such as when VSYNC 306 is in a logic-low state) and may resume the sampling of the data signal 301 by the I2S interface 322 when the VSYNC signal 306 indicates that the data signal 301 carries valid image data (such as when VSYNC 306 is in a logic-high state).

Figure 4:
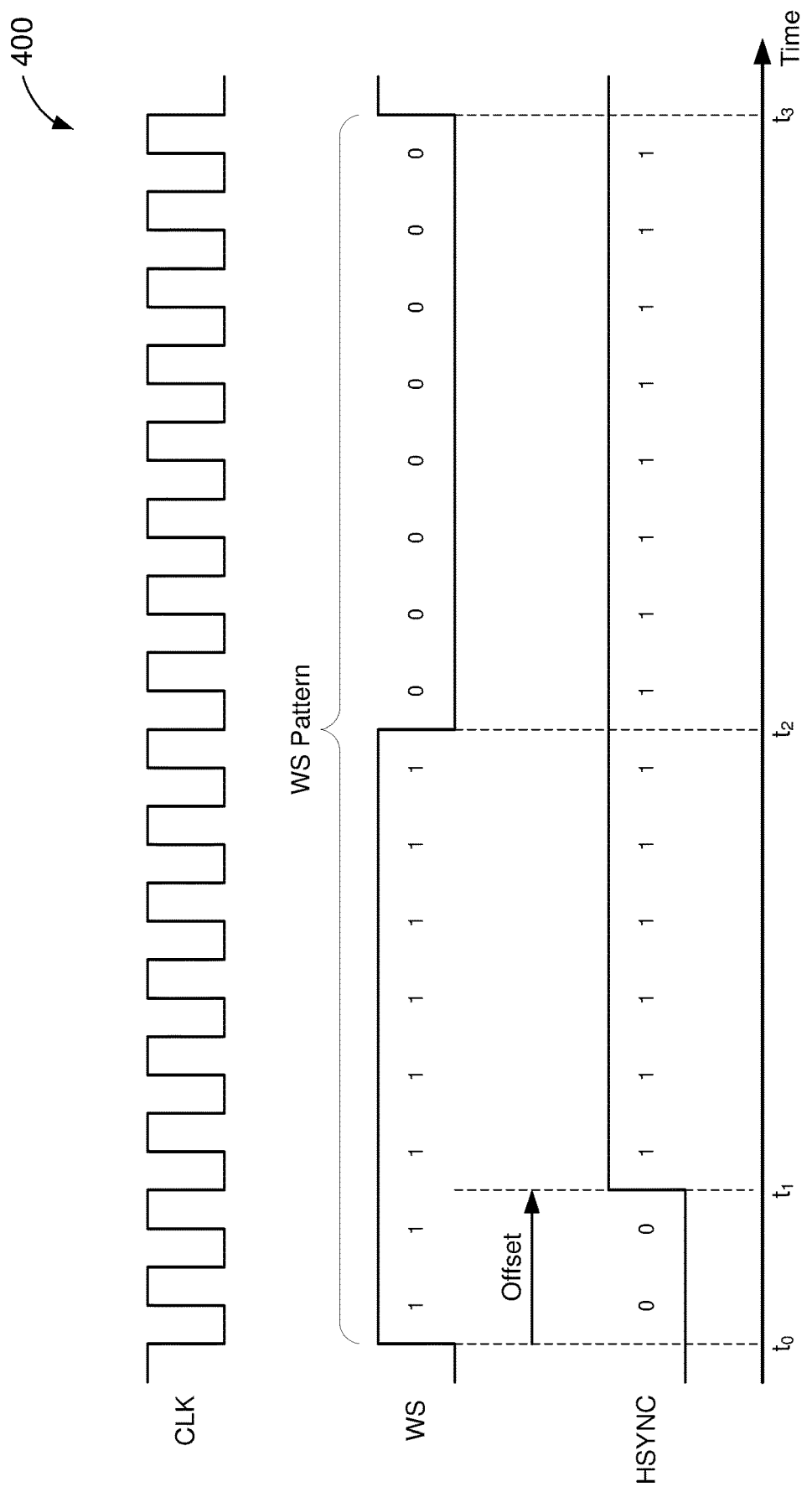
FIG. 4 shows a timing diagram depicting an example operation for aligning a word select (WS) signal with a horizontal synchronization (HSYNC) signal, according to some implementations.

FIG. 4 shows a timing diagram 400 depicting an example operation for aligning a WS signal with an HSYNC signal, according to some implementations. In some implementations, the example operation may be performed by the image processing device 320 of FIG. 3. With reference for example to FIG. 3, the master I2S interface 321 receives an HSYNC signal 305 (HSYNC) at $SD_{in}$ and outputs a WS signal 303 (WS) and a clock signal 304 (CLK) from $SD_{out}$ and $SCK_{out}$, respectively.

In some implementations, the master I2S interface 321 may produce the WS signal by outputting a pattern of bits (also referred to as the "WS pattern") from $SD_{out}$. In the example of FIG. 4, the WS pattern includes eight 1's followed by eight 0's (or "1111111100000000"). However, the WS pattern may include any number of 1's and 0's in other implementations. In some implementations, the master I2S interface 321 may output a respective bit of the WS pattern in response to each rising edge of the CLK signal. As shown in FIG. 4, the WS pattern spans a duration from times $t_0$ to $t_3$. Accordingly, the WS signal is driven to a logic-high state from times $t_0$ to $t_2$ (in response to each "1" bits output by the master I2S interface 321) and is driven to a logic-low state from times $t_2$ to $t_3$ (in response to each "0" bit output by the master I2S interface 321). Although not shown for simplicity, the master I2S interface 321 may repeatedly output WS pattern, at time $t_3=s$ and beyond, to produce a continuous WS signal.

In the example of FIG. 4, the master I2S interface 321 samples the HSYNC signal to obtain a series of HSYNC bits. In some implementations, the master I2S interface 321 may capture a respective HSYNC bit in response to each rising edge of the CLK signal. The HSYNC bits acquired between times $t_0$ and $t_3$ include two 0's followed by fourteen 1's. As shown in FIG. 4, the rising edge of the HSYNC signal, at time $t_1$, trails the rising edge of the WS signal, at time $t_0$, by two clock cycles. In other words, the 0-to-1 transition among the HSYNC bits occurs two bits later than the 0-to-1 transition at the beginning of the WS pattern. In some implementations, the controller 323 may adjust the WS pattern so that the rising edge of the WS signal is aligned with the rising edge of the HSYNC signal (at time $t_1$). For example, the controller 323 may rotate the WS pattern two bit positions to the right. As a result of the rotation, the adjusted WS pattern may include two 0's, followed by eight 1's, followed by six 0's (or "0011111111000000").

Figure 5:
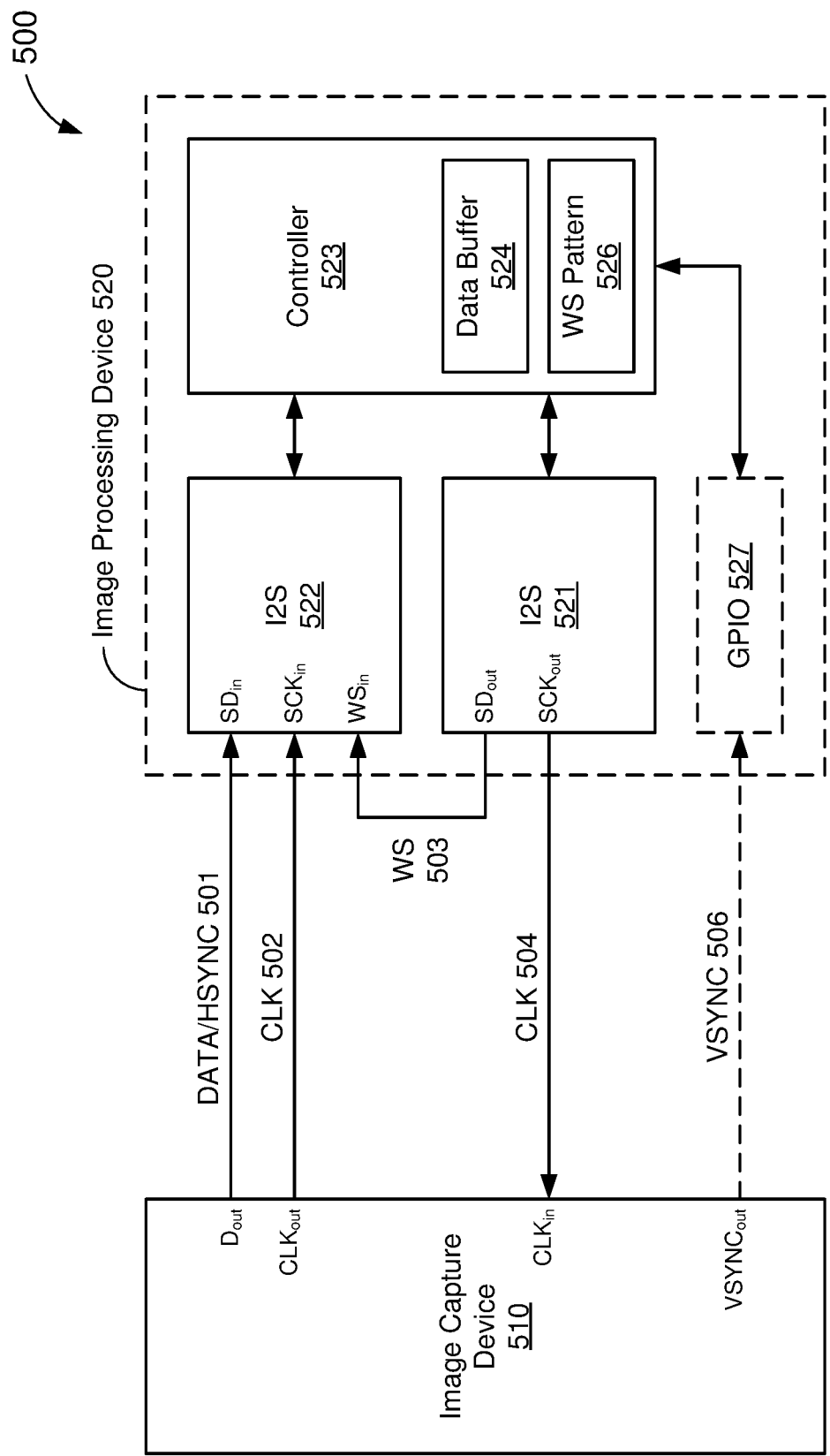
FIG. 5 shows another block diagram of a digital imaging system, according to some implementations.

FIG. 5 shows another block diagram of a digital imaging system 500, according to some implementations. The digital imaging system 500 includes an image capture device 510 and an image processing device 520. In some implementations, the image capture device 510 and the image processing device 520 may be examples of the image source 110 and the image processor 120, respectively, of FIG. 1.

In the example of FIG. 5, the image capture device 510 is shown to include a data output ($D_{out}$) configured to output a serial data/HSYNC signal 501, a clock output ($CLK_{out}$) configured to output a clock signal 502, a clock input ($CLK_{in}$) configured to receive a clock signal 504. In some aspects, the image capture device 510 may be a camera that captures a pattern of light from a scene and converts the light to digital image data. In such aspects, the serial data/HSYNC signal 501 may carry the image data generated by the image capture device 510 and the clock signal 502 may indicate a timing of the bits in the data signal 501. In some implementations, the data/HSYNC signal 501 and the clock signal 502 may be examples of the SD signal and the SCK signal, respectively, of FIGS. 2A and 2B. In some implementations, the image capture device 510 may generate the clock signal 502 based on the received clock signal 504. In such implementations, the clock signals 502 and 504 may have the same frequency.

The image processing device 520 includes I2S interfaces 521 and 522 and a controller 523. In some implementations, each of the I2S interfaces 521 and 522 may be one example of the I2S interface 200 of FIG. 2. In the example of FIG. 5, the first I2S interface 521 is configured to operate in a master mode and the second I2S interface 522 is configured to operate in a slave mode. The master I2S interface 521 is shown to include a serial data output ($SD_{out}$) configured to output a WS signal 503 and a serial clock output ($SCK_{out}$) configured to output the clock signal 504. The slave I2S interface 522 is shown to include a serial data input ($SD_{in}$) configured to receive the data/HSYNC signal 501, a serial clock input ($SCK_{in}$) configured to receive the clock signal 502, and a word select input ($WS_{in}$) configured to receive the WS signal 503.

The controller 523 controls an operation of the I2S interfaces 521 and 522. In some aspects, the controller 523 may operate the I2S interfaces 521 and 522 to capture or receive frames of image data output by the image capture device 510. During a setup phase, the image capture device 510 may output a series of HSYNC bits, representing an HSYNC signal, from $D_{out}$. In other words, the HSYNC bits may be carried on the data/HSYNC signal 501. In some implementations, the image processing device 520 may align rising (or falling) edges of the HSYNC signal with respective edges of the WS signal 503. As described with reference to FIG. 2B, the WS signal 503 may be generated by outputting a WS pattern 526 from the master I2S interface 521. Accordingly, the phase of the WS signal 503 depends on the arrangement of bits in the WS pattern 526. In some implementations, the controller 523 may store an initial or default bit pattern as the WS pattern 526.

In the example of FIG. 5, the slave I2S interface 522 acquires the HSYNC bits by sampling the data/HSYNC signal 501, responsive to the clock signal 502, over a duration spanning at least a period of the WS signal 503. The controller 523 may store the HSYNC bits in a data buffer 524. In some aspects, the controller 523 may compare the HSYNC bits stored in the data buffer 524 with the WS pattern 526 to determine a phase offset between a rising (or falling) edge of the HSYNC signal (not shown for simplicity) and a rising (or falling) edge of the WS signal 503. For example, a rising edge of the HSYNC signal occurs when the HSYNC bit values in the data buffer 524 transition from 0 to 1. Similarly, a rising edge of the WS signal 503 occurs when the bit values in the WS pattern 526 transition from 0 to 1. In some implementations, the controller 523 may adjust the WS pattern 526 so that the 0-to-1 bit transition in the WS pattern 526 is aligned with the 0-to-1 bit transition in the data buffer 524. As a result, the rising edge of the HSYNC signal is aligned with a rising edge of the WS signal 303.

During a data capture phase, the controller 523 captures one or more frames of image data received via the slave I2S interface 522. For example, the slave I2S interface 522 may acquire bits of image data by sampling the data/HSYNC signal 501 (at $SD_{in}$) responsive to the clock signal 502. In some implementations, the controller 523 may store each bit of image data in a portion of the data buffer 524 associated with the state of the WS signal 503 when the bit of image data is acquired. For example, each bit of image data acquired while the WS signal 503 is in a logic-high state may be stored in a portion of the data buffer 524 associated with a left audio channel, and each bit of image data acquired while the WS signal 503 is in a logic-low state may be stored in a portion of the data buffer 524 associated with a right audio channel. Because the WS signal 503 is aligned with the HSYNC signal, each unit of image data is also aligned with a respective 8-bit boundary in the data buffer 524 and can thus be recovered for further processing.

In some aspects, the image processing device 520 may leverage pixel clock gating capabilities of the image capture device 510 to reduce the amount of data discarded by the image processing device 520. For example, the image capture device 510 may further include a VSYNC output ($VSYNC_{out}$) configured to output a VSYNC signal 506. In some implementations, the image processing device 520 may include a GPIO 527 configured to receive the VSYNC signal 506. In such implementations, the controller 523 may control the slave I2S interface 522 to selectively sample the data/HSYNC signal 501 based on the state of the VSYNC signal 506. For example, the controller 523 may pause the sampling of the data/HSYNC signal 501 by the I2S interface 522 when the VSYNC signal 506 indicates that the data/HSYNC signal 501 does not carry valid image data (such as when VSYNC 506 is in a logic-low state) and may resume the sampling of the data/HSYNC signal 501 by the I2S interface 522 when the VSYNC signal 506 indicates that the data/HSYNC signal 501 carries valid image data (such as when VSYNC 506 is in a logic-high state).

Figure 6:
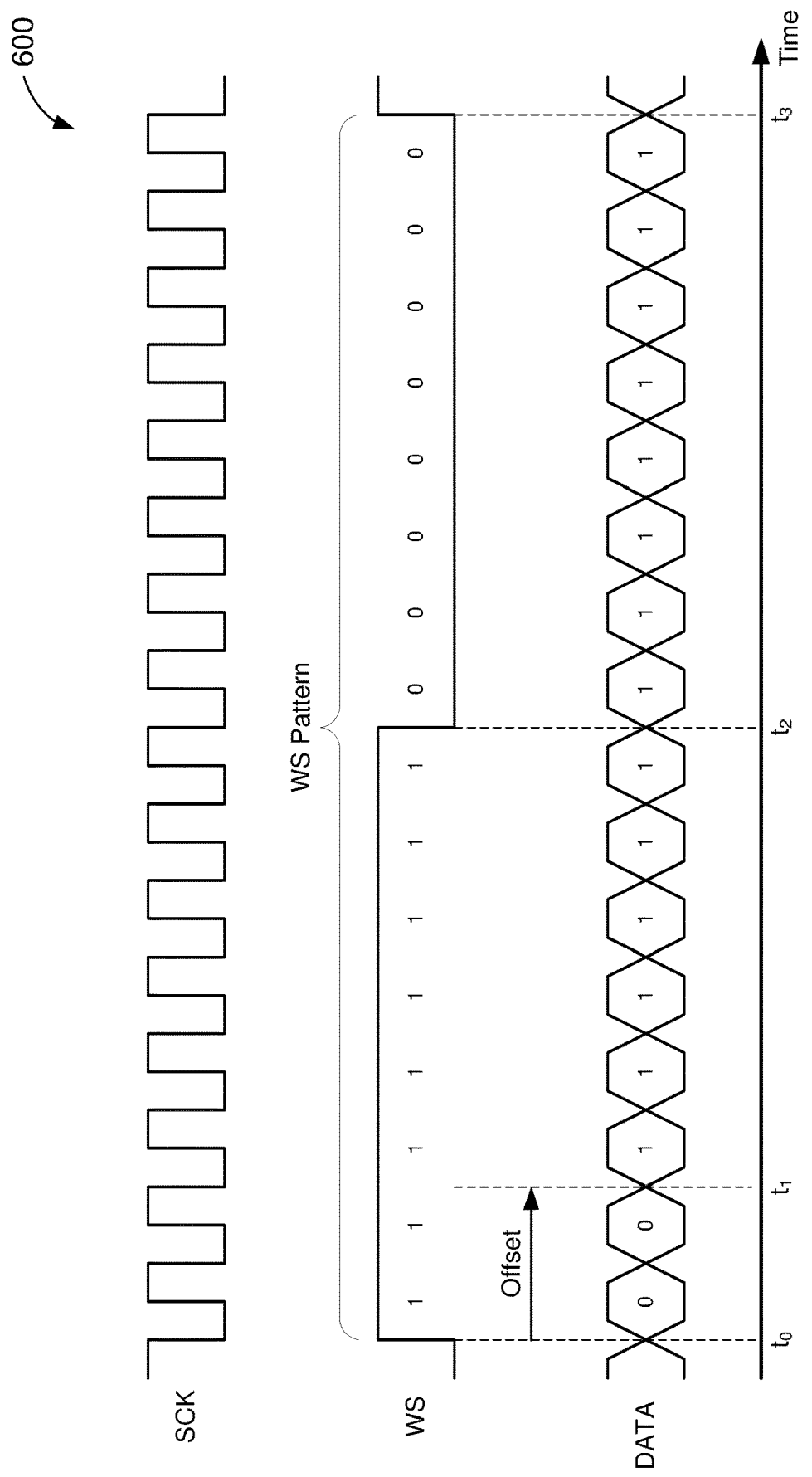
FIG. 6 shows another timing diagram depicting an example operation for aligning a WS signal with an HSYNC signal, according to some implementations.

FIG. 6 shows another timing diagram 600 depicting an example operation of an image processing device, according to some implementations. In some implementations, the example operation may be performed by the image processing device 520 of FIG. 5. With reference for example to FIG. 5, the slave I2S interface 522 receives a data/HSYNC signal 501 (DATA) at $SD_{in}$ and the master I2S interface 521 outputs a WS signal 503 (WS) and a clock signal 504 (CLK) from $SD_{out}$ and $SCK_{out}$, respectively.

In some implementations, the master I2S interface 521 may produce the WS signal by outputting a pattern of bits (also referred to as the "WS pattern") from $SD_{out}$. In the example of FIG. 6, the WS pattern includes eight 1's followed by eight 0's (or "1111111100000000"). However, the WS pattern may include any number of 1's and 0's in other implementations. In some implementations, the master I2S interface 521 may output a respective bit of the WS pattern in response to each rising edge of the CLK signal. As shown in FIG. 6, the WS pattern spans a duration from times $t_0$ to $t_3$. Accordingly, the WS signal is driven to a logic-high state from times $t_0$ to $t_2$ (in response to each "1" bits output by the master I2S interface 521) and is driven to a logic-low state from times $t_2$ to $t_3$ (in response to each "0" bit output by the master I2S interface 521). Although not shown for simplicity, the master I2S interface 521 may repeatedly output WS pattern, at time $t_3$ and beyond, to produce a continuous WS signal.

In the example of FIG. 6, the slave I2S interface 522 samples the DATA signal to obtain a series of HSYNC bits. In some implementations, the slave I2S interface 522 may capture a respective HSYNC bit in response to each rising edge of the CLK signal. The HSYNC bits acquired between times $t_0$ and $t_3$ include two 0's followed by fourteen 1's. As shown in FIG. 6, the rising edge of the DATA signal, at time $t_1$, trails the rising edge of the WS signal, at time $t_0$, by two clock cycles. In other words, the 0-to-1 transition among the HSYNC bits occurs two bits later than the 0-to-1 transition at the beginning of the WS pattern. In some implementations, the controller 523 may adjust the WS pattern so that the rising edge of the WS signal is aligned with the rising edge of the DATA signal (at time $t_1$). For example, the controller 523 may rotate the WS pattern two bit positions to the right. As a result of the rotation, the adjusted WS pattern may include two 0's, followed by eight 1's, followed by six 0's (or "0011111111000000").

Figure 7:
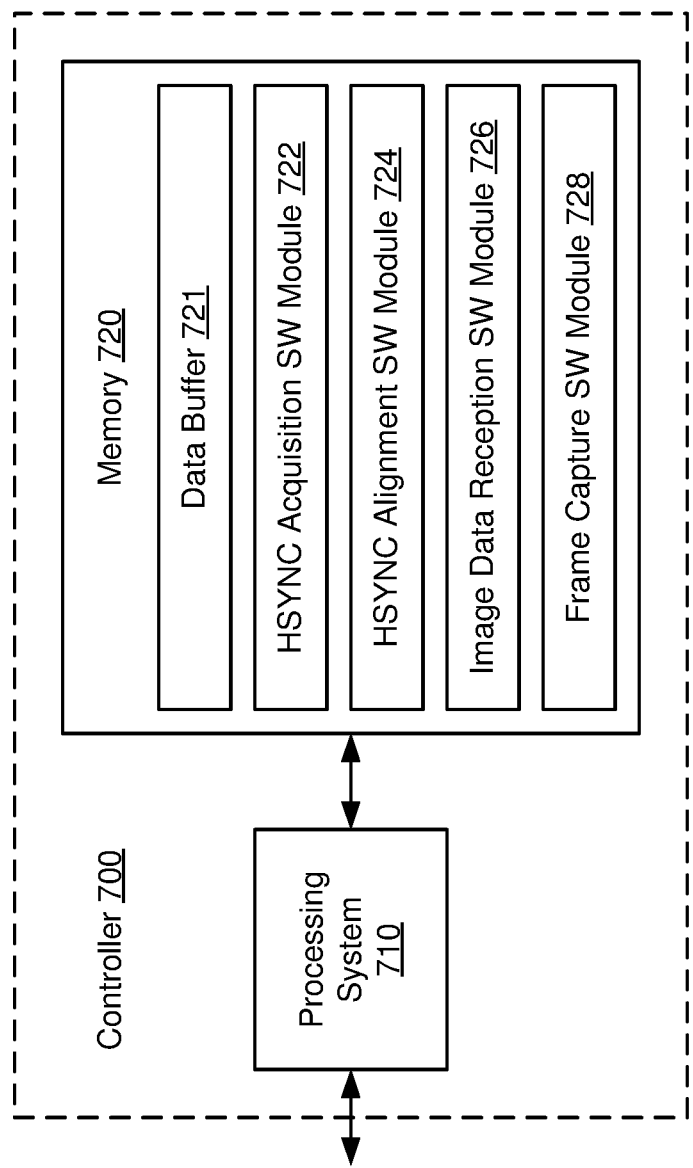
FIG. 7 shows a block diagram of a controller for an image processing device, according to some implementations.

FIG. 7 shows a block diagram of a controller 700 for an image processing device, according to some implementations. More specifically, the controller 700 may be configured to control a reception of image data by an image processing device. In some implementations, the image processing device may be one example of any of the image processing devices 320 or 520 of FIGS. 3 and 5, respectively, and the controller 700 may be one example of any of the controllers 323 or 523.

The controller 700 includes a processing system 710 and a memory 720. In some implementations, the controller 700 may be coupled to one or more non-video interfaces that are configured to communicate with an image source (such as any of the image capture device 310 or 510 of FIGS. 3 and 5, respectively). At least one of the non-video interfaces may be configured to receive image data from the image source. In some implementations, each of the non-video interfaces may be an I2S serial bus interface (such as any of the I2S interfaces 200, 321, 322, 521, or 522 of FIGS. 2, 3, and 5).

The memory 720 may include a data buffer 721 configured to store or buffer any data received via the one or more non-video interfaces. The memory 720 also may include a non-transitory computer-readable medium (including one or more nonvolatile memory elements, such as EPROM, EEPROM, Flash memory, a hard drive, and the like) that may store at least the following software (SW) modules:
- an HSYNC acquisition SW module 722 to obtain a series of bits representing an HSYC signal associated with the image data output by the image source;
- an HSYNC alignment SW module 724 to generate a local synchronization signal based at least in part on the obtained series of bits representing the HSYNC signal;
- an image data reception SW module 726 to receive the image data via a non-video interface associated with the image processing device; and
- a frame capture SW module 728 to capture a frame of the received image data so that the beginning of the frame is aligned with an edge of the local synchronization signal.

Each software module includes instructions that, when executed by the processing system 710, causes the controller 700 to perform the corresponding functions.

The processing system 710 may include any suitable one or more processors capable of executing scripts or instructions of one or more software programs stored in the controller 700 (such as in memory 720). For example, the processing system 710 may execute the HSYNC acquisition SW module 722 to obtain a series of bits representing an HSYC signal associated with the image data output by the image source. The processing system 710 also may execute the HSYNC alignment SW module 724 to generate a local synchronization signal based at least in part on the obtained series of bits representing the HSYNC signal. Further, the processing system 710 may execute the image data reception SW module 726 to receive the image data via a non-video interface associated with the image processing device. Still further, the processing system 710 may execute the frame capture SW module 726 to capture a frame of the received image data so that the beginning of the frame is aligned with an edge of the local synchronization signal.

Figure 8:
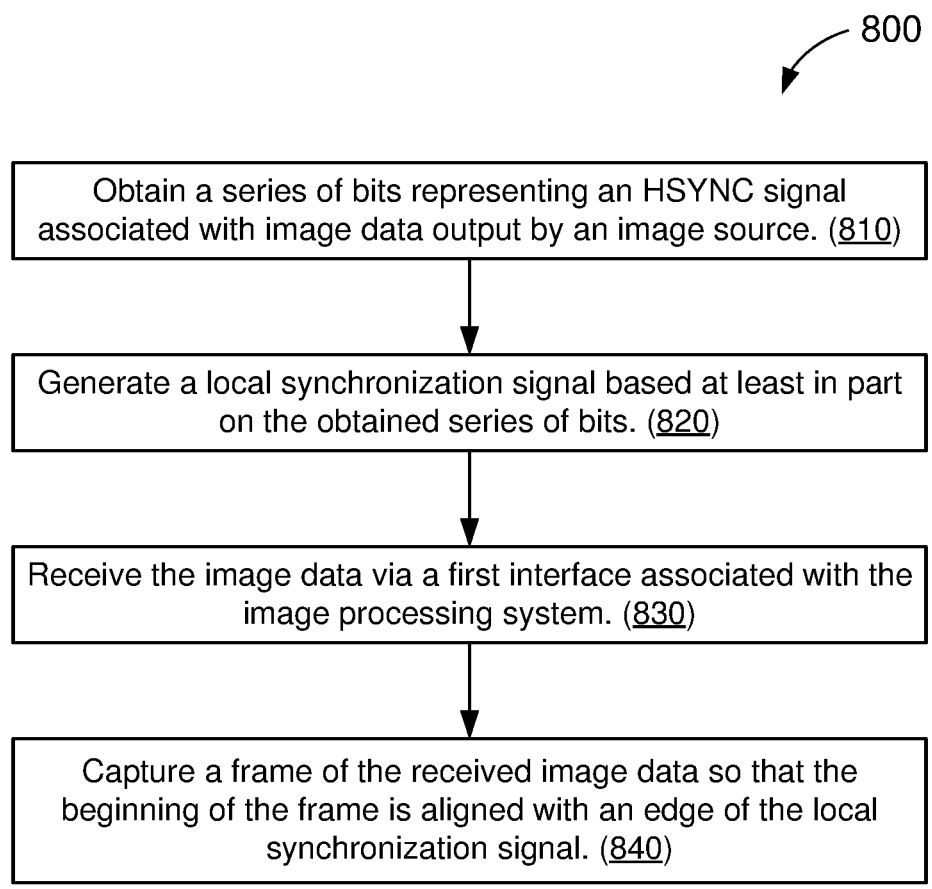
FIG. 8 shows an illustrative flowchart depicting an example operation for receiving image data via a non-video interface, according to some implementations.

FIG. 8 shows an illustrative flowchart depicting an example operation 800 for receiving image data via a non-video interface, according to some implementations. In some implementations, the example operation 800 may be performed by a controller for an image processing device (such as any of the controller 323, 523, or 700 of FIGS. 3, 5, and 7, respectively).

The controller may obtain a series of bits representing an HSYNC signal associated with image data output by an image source (810). The controller may generate a local synchronization signal based at least in part on the obtained series of bits (820). The controller also may receive the image data via a first interface associated with the image processing system (830). The controller may further capture a frame of the received image data so that the beginning of the frame is aligned with an edge of the local synchronization signal (840). In some implementations, the first interface may be an I2S interface, and the local synchronization signal may be a WS signal associated with the I2S serial bus interface standard In some implementations, the controller may receive the series of bits directly from the image source, via the first interface. In such implementations, the series of bits may be received at the same input of the first interface as the image data. In some other implementations, the controller may obtain the series of bits by receiving the HSYNC signal via a second interface associated with the image processing device, where the HSYNC signal is sampled responsive to transitions of a first clock signal and each of the samples of the HSYNC signal represents a respective bit in the series of bits.

In some implementations, the controller may further output the first clock signal to the image source via the second interface and receive, via the first interface, a second clock signal associated with the first clock signal. In such implementations, the image data may be sampled responsive to transitions of the second clock signal.

In some implementations, the controller may generate the local synchronization signal by outputting, via a second interface associated with the image processing device, a bit pattern representing the local synchronization signal and receiving the bit pattern via the first interface. In such implementations, the controller may perform a transition detection operation that indicates a transition in values associated with the obtained series of bits and may adjust the bit pattern so that an edge of the local synchronization signal is aligned with the transition indicated by the transition detection operation.

Still further, in some implementations, the controller may receive a VSYNC signal associated with the image data and detect a transition of the VISC signal. In such implementations, the reception of the image data may be initiated responsive to detecting the edge of the VSYNC signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method performed by a controller for an image processing device, comprising:
   receiving, via a first interface associated with the image processing device, a horizontal synchronization (HSYNC) signal associated with image data output by an image source, the first interface sampling the HSYNC signal responsive to transitions of a first clock signal so that each of the samples of the HSYNC signal represents a respective bit in a series of bits;
   generating a local synchronization signal based at least in part on the series of bits;
   receiving the image data via a second interface associated with the image processing device; and
   capturing a frame of the received image data so that the beginning of the frame is aligned with an edge of the local synchronization signal.

2. The method of claim 1, further comprising:
   outputting the first clock signal to the image source via the first interface; and
   receiving, via the second interface, a second clock signal associated with the first clock signal.

3. The method of claim 2, wherein the image data is sampled by the second interface responsive to transitions of the second clock signal.

4. The method of claim 1, wherein the generating of the local synchronization signal comprises:
   outputting, via the first interface, a bit pattern representing the local synchronization signal; and
   receiving the bit pattern via the second interface.

5. The method of claim 4, wherein the generating of the local synchronization signal further comprises:
   performing a transition detection operation that indicates a transition in values associated with the obtained series of bits; and
   adjusting the bit pattern so that an edge of the local synchronization signal is aligned with the transition indicated by the transition detection operation.

6. The method of claim 1, further comprising:
   receiving a vertical synchronization (VSYNC) signal associated with the image data; and
   detecting a transition of the VSYNC signal.

7. The method of claim 6, wherein the reception of the image data is initiated responsive to detecting the transition of the VSYNC signal.

8. The method of claim 1, wherein each of the first and second interfaces is an audio interface conforming to an electrical serial bus interface standard.

9. The method of claim 8, wherein the electrical serial bus interface standard comprises the inter-integrated circuit sound (I2S) serial bus interface standard.

10. The method of claim 9, wherein the local synchronization signal is a word select (WS) signal associated with the I2S serial bus interface standard.

11. A controller for an image processing device, comprising:
    a processing system; and
    a memory storing instructions that, when executed by the processing system, causes the controller to:
    receive, via a first interface associated with the image processing device, a horizontal synchronization (HSYNC) signal associated with image data output by an image source, the first interface sampling the HSYNC signal responsive to transitions of a first clock signal so that each of the samples of the HSYNC signal represents a respective bit in a series of bits;
    generate a local synchronization signal based at least in part on the series of bits;
    receive the image data via a second interface associated with the image processing device; and
    capture a frame of the received image data so that the beginning of the frame is aligned with an edge of the local synchronization signal.

12. The controller of claim 11, wherein execution of the instructions further causes the controller to:
    output the first clock signal to the image source via the first interface; and
    receive, via the second interface, a second clock signal associated with the first clock signal.

13. The controller of claim 12, wherein the image data is sampled by the second interface responsive to transitions of the second clock signal.

14. The controller of claim 11, wherein the generating of the local synchronization signal comprises:
    outputting, via the first interface, a bit pattern representing the local synchronization signal; and
    receiving the bit pattern via the second interface.

15. The controller of claim 14, wherein the generating of the local synchronization signal further comprises:
    performing a transition detection operation that indicates a transition in values associated with the obtained series of bits; and
    adjusting the bit pattern so that an edge of the local synchronization signal is aligned with the transition indicated by the transition detection operation.

16. The controller of claim 11, wherein execution of the instructions further causes the controller to:
  receive a vertical synchronization (VSYNC) signal associated with the image data; and
  detect a transition of the VSYNC signal.

17. The controller of claim 16, wherein the reception of the image data is initiated responsive to detecting the transition of the VSYNC signal.

18. The controller of claim 11, wherein each of the first and second interfaces is an audio interface conforming to an electrical serial bus interface standard.

19. The controller of claim 18, wherein the electrical serial bus interface standard comprises the inter-integrated circuit sound (I2S) serial bus interface standard.

20. The controller of claim 19, wherein the local synchronization signal is a word select (WS) signal associated with the I2S serial bus interface standard.

* * * * *